US011019564B2

(12) United States Patent
Grayson et al.

(10) Patent No.: US 11,019,564 B2
(45) Date of Patent: May 25, 2021

(54) ROAMING CONSORTIUM IDENTIFIER (RCOI)-BASED SYSTEM FOR HANDLING IDENTITY REQUIREMENTS

(71) Applicant: Cisco Technology, Inc., San Jose, CA (US)

(72) Inventors: Mark Grayson, Berkshire (GB); Jerome Henry, Pittsboro, NC (US); Malcolm Muir Smith, Richardson, TX (US); Bart A. Brinckman, Nevele (BE)

(73) Assignee: Cisco Technology, Inc., San Jose, CA (US)

(*) Notice: Subject to any disclaimer, the term of this patent is extended or adjusted under 35 U.S.C. 154(b) by 16 days.

(21) Appl. No.: 16/511,879

(22) Filed: Jul. 15, 2019

(65) Prior Publication Data

US 2020/0163013 A1 May 21, 2020

Related U.S. Application Data

(60) Provisional application No. 62/770,553, filed on Nov. 21, 2018.

(51) Int. Cl.
| *H04W 4/00* | (2018.01) |
| *H04W 48/20* | (2009.01) |
| *H04W 8/08* | (2009.01) |
| *H04W 84/12* | (2009.01) |
| *H04W 84/04* | (2009.01) |

(52) U.S. Cl.
CPC ............ *H04W 48/20* (2013.01); *H04W 8/08* (2013.01); *H04W 84/042* (2013.01); *H04W 84/12* (2013.01)

(58) Field of Classification Search
None
See application file for complete search history.

(56) References Cited

U.S. PATENT DOCUMENTS

| 2012/0281609 A1* | 11/2012 | Kasslin | H04W 48/14 370/312 |
| 2013/0176897 A1* | 7/2013 | Wang | H04L 12/06 370/254 |
| 2013/0242783 A1* | 9/2013 | Horn | H04W 28/08 370/252 |
| 2013/0272289 A1* | 10/2013 | Yao | H04W 48/16 370/338 |

(Continued)

OTHER PUBLICATIONS

International Search Report with Written Opinion dated Feb. 3, 2020 issued in International Application PCT/US2019/061488, 22 pages.

(Continued)

*Primary Examiner* — Gerald A Smarth
(74) *Attorney, Agent, or Firm* — Merchant & Gould P.C.

(57) ABSTRACT

Roaming Consortium Identifier (RCOI)-based handling of identity requirements may be provided. First, an access device may advertise an identifier. The identifier may identify a roaming federation and an identity type used by a service provider in order to provide service by the access device. Next, a request to associate with the access device may be received from a user device. The request may be compliant with the identity type advertised in the identifier. The user device may then be associated with the access device in response to receiving the request.

20 Claims, 3 Drawing Sheets

(56) References Cited

U.S. PATENT DOCUMENTS

| | | | | |
|---|---|---|---|---|
| 2014/0023059 A1* | 1/2014 | Gupta | ............... | H04W 8/085 |
| | | | | 370/338 |
| 2014/0140288 A1* | 5/2014 | Jung | ............... | H04W 48/20 |
| | | | | 370/329 |
| 2015/0124705 A1* | 5/2015 | Huang | ............... | H04W 48/20 |
| | | | | 370/328 |
| 2015/0373579 A1* | 12/2015 | Xu | ............... | H04W 48/16 |
| | | | | 370/230 |
| 2016/0006739 A1* | 1/2016 | Huang | ............... | H04W 12/003 |
| | | | | 726/5 |
| 2016/0081009 A1* | 3/2016 | Tailor | ............... | H04W 4/80 |
| | | | | 455/432.1 |
| 2017/0201938 A1* | 7/2017 | Kim | ............... | H04W 48/20 |
| 2017/0230905 A1 | 8/2017 | Pularikkal et al. | | |

OTHER PUBLICATIONS

Friel, O. "BRSKI over IEEE 802.11 DRAFT-FRIEL-ANIMA-BRSKI-OVER-802DOT11-00"; Internet-Draft: Network Working Group, Internet Engineering Task Force, IETF; Standard Working Draft, Internet Society (ISOC) 4, Rue Des Falaises CH- 1205 Geneva, Switzerland, Oct. 18, 2018; (30 pages).

Alcatel Lucent: "Wi-Fi Roaming -Building on ANDSF and Hotspot2. 0", Internet Citation, [retrieved on Feb. 27, 2012] Feb. 27, 2012; Retrieved from the Internet: URL:http://www.alcatel-lucent.com (45 pages).

"Open Connection Manager API ; OMA-TS-OpenCMAPI-VI 1-20140916-D-cb", OMA-TS-OPENCMAPI-VI-1-20140916-D-CB, Open Mobile Alliance (OMA), San Diego, CA 92122; Sep. 16, 2014, Retrieved from the Internet: URL:ftp/Public documents/CD/OpenCMAPI/Permanent documents/[retrieved on Nov. 20, 2014] p. 220; table 7; (407 pages).

Lavrukhin, Vladimir: "An overhead analysis of Access Network Query Protocol (ANQP) in hotspot 2.0 Wi-Fi networks", 2013 13th International Conference on Its Telecommunications (ITST), IEEE, Nov. 5, 2013; pp. 266-271, XP032532088, DOI: 10.1109/ITST. 2013.6685557 [retrieved on Dec. 16, 2013] p. 268; figure 2 (6 pages).

Adrangi et al.; draft-adrangi-eap-network-discovery-11.txt Identity Selection Hints for Extensible Authentication Protocol (EAP); draft-adrangi-eap-network-discovery-11.txt Internet Engineering Task Force, IETF; Standard Working Draft, Internet Society (ISOC) 4, Rue Des Falaises CH- 1205 Geneva, Switzerland, No. 11, Mar. 22, 2005 (13 pages).

\* cited by examiner

ROAMING CONSORTIUM IDENTIFIER (RCOI)-BASED SYSTEM FOR HANDLING IDENTITY REQUIREMENTS

RELATED APPLICATION

Under provisions of 35 U.S.C. § 119(e), Applicant claims the benefit of U.S. Provisional Application No. 62/770,553 filed Nov. 21, 2018, which is incorporated herein by reference.

TECHNICAL FIELD

The present disclosure relates generally to a roaming consortium and automated onboarding in WiFi.

BACKGROUND

In computer networking, a wireless Access Point (AP) is a networking hardware device that allows a Wi-Fi compliant client device to connect to a wired network. The AP usually connects to a router (directly or indirectly via a wired network) as a standalone device, but it can also be an integral component of the router itself. Several APs may also work in coordination, either through direct wired or wireless connections, or through a central system, commonly called a Wireless Local Area Network (WLAN) controller. An AP is differentiated from a hotspot, which is the physical location where Wi-Fi access to a WLAN is available.

Prior to wireless networks, setting up a computer network in a business, home or school often required running many cables through walls and ceilings in order to deliver network access to all of the network-enabled devices in the building. With the creation of the wireless AP, network users are able to add devices that access the network with few or no cables. An AP normally connects directly to a wired Ethernet connection and the AP then provides wireless connections using radio frequency links for other devices to utilize that wired connection. Most APs support the connection of multiple wireless devices to one wired connection. APs are built to support a standard for sending and receiving data using these radio frequencies.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
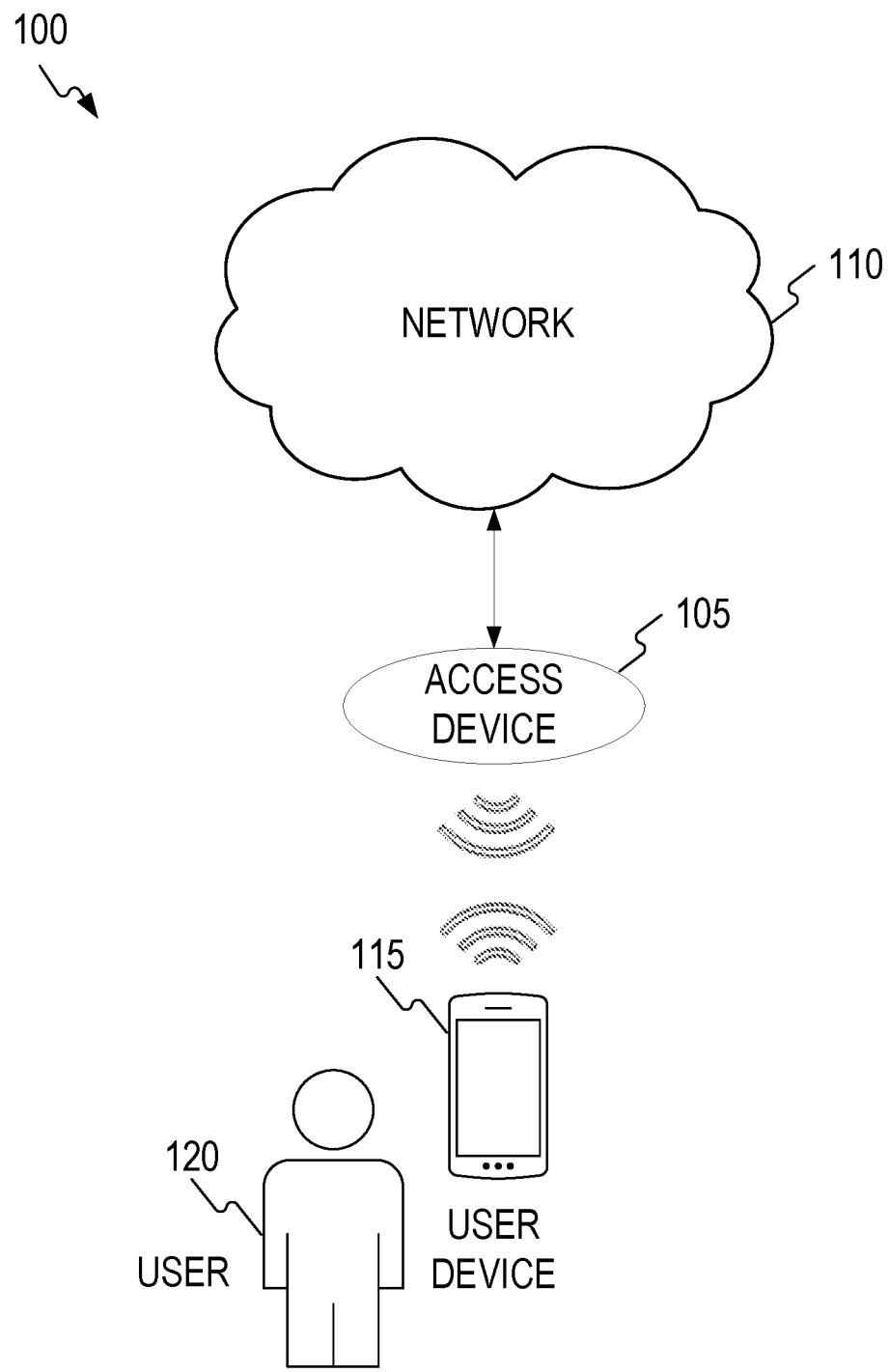
FIG. 1 is a block diagram of an operating environment for Roaming Consortium Identifier (RCOI)-based handling of identity requirements.

Roaming Consortium Identifier (RCOI)-based handling of identity requirements may be provided. First, an access device may advertise an identifier. The identifier may identify a roaming federation and an identity type used by a service provider in order to provide service by the access device. Next, a request to associate with the access device may be received from a user device. The request may be compliant with the identity type advertised in the identifier. The user device may then be associated with the access device in response to receiving the request.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

An open roaming federation may be formed based on common criteria and requirements that may require members to adhere to common terms of service or policies. A Wi-Fi open roaming federation may be automatically onboarded by a local access service provider, while a neutral federation may relay the authentication task to one of many possible identity providers. In defining such a roaming federation, there may be a need to be as inclusive as possible to ensure the federation is as broadly deployed as possible, while also accepting that there may be some key differences associated with the concepts of identity and identity validation.

Example identity types may comprise public versus private and weak versus strong identities. With public versus private, enterprise IT operations (e.g., within a company) may have a highlighted requirement to uniquely identify guests roaming onto the local (e.g., company Internet) Wi-Fi system. Before roaming federations, this was achieved using a portal redirect and credentials generated by a known identity (i.e., a company staff member). With roaming federations, there may be a need to achieve such identification in a federated automatic roaming environment. However, identity providers and/or users of the roaming federation may want to prohibit operations in some environments where their actual real identities are exposed to an untrusted service provider. These two requirements (i.e., a service provider mandating guest identification and an identity provider or user not wanting their actual real identity exposed to some service providers) may not be contradictory because the requirement for one or the other may be location-dependent (e.g., a user's actual real identity may be required to be exposed to access the company guest network, but may not be needed in a shopping mall). However, there may be no process to convey the location-specific requirements to a user device.

With weak versus strong identities, authentication through a local access provider may leverage multiple possible identities present in the user device (e.g., International Mobile Equipment Identity WED-based, Operating System (OS)-based, or identities available in applications such as social media applications and others). However, not all identities available are equal. For example, with some roaming federations, a user may be able to get a roaming federation credential with a simplified sign-up process (in this context, the identity is seen as weak). Also, some access providers only want to deal with classical service providers who are associated with a billing relationship, and not those associated with webscale providers, where the requirements for root of trust are less. In other environments, light identification is sufficient or desirable (e.g., for privacy protection or to limit the chain of liability). Accordingly, there may be a need to solve the problem of defining a common roaming federation that is able to handle and communicate different identity characteristics and requirements.

Roaming consortiums may not deal with classical identities, but may have no other choice (e.g., one consortium, one identity set, statically associated to that consortium). A federation may open this limitation by allowing several identity providers, and thus several possible identities to access the same network. However, the issue may become which identity is acceptable in which location for which access providers. For example, two locations (e.g., a shopping mall and a court house) may both have a public access network and be part of the same general federation, but may have different rules about what type of credentials are allowed (e.g., anonymous verses clear user identification). Embodiments of the disclosure may enable the association between a Roaming Consortium Identifier (RCOI) and identity characteristics that then may enable multiple different types of identity to be used within a single federation while still respecting each local access provider's identity constraints.

Furthermore, embodiments of the disclosure may map a label with a particular set of identity characteristics, and therefore automate the association (and advertisement) of the local access provider requirements to the types of identities configured in each user device. Embodiments of the disclosure may automate this mapping, allowing the user device to automatically pick a "best" identity possible (best compromise between the local access provider requirements and the types of credentials available on a user device). The RCOI label may be a way to achieve this goal within a standard advertisements.

FIG. 1 shows a block diagram of an operating environment 100 for Roaming Consortium Identifier (RCOI)-based handling of identity requirements consistent with embodiments of the disclosure. As shown in FIG. 1, operating environment 100 may comprise an access device 105, a network 110, and a user device 115 operated by user 120. An open roaming federation may link enterprises, service providers, and identity providers to provide a process for seamless onboarding across participating Service Set Identifiers (SSIDs) with Roaming Consortium Identifiers (RCOIs) indicating open roaming.

In some embodiments of the disclosure, access device 105 may comprise a Wi-Fi Access Point (AP) configured to support a Wi-Fi hotspot. The Wi-Fi hotspot may comprise a physical location where user 120, operating user device 115, may obtain access to network 110 (e.g., Internet access), using Wi-Fi technology, via a Wireless Local Area Network (WLAN) using a router connected to a service provider.

In other embodiments of the disclosure, access device 105 may comprise a device that may be connected to a cellular network that may communicate directly and wirelessly with end use devices (e.g., user device 115 operated by user 120) to provide access to network 110 (e.g., Internet access). For example, access device 105 may comprise, but is not limited to, an eNodeB (eNB) or a gNodeB (gNB). The aforementioned cellular network may comprise, but is not limited to, a Long-Term Evolution (LTE) broadband cellular network, a Fourth Generation (4G) broadband cellular network, or a Fifth Generation (5G) broadband cellular network, operated by a service provider.

User device 115 may comprise, but is not limited to, a smartphone, a tablet device, a personal computer, a mobile device, a cellular base station, a telephone, a remote control device, a set-top box, a digital video recorder, a cable modem, a network computer, a mainframe, a router, or other similar microcomputer-based device capable of accessing and using a Wi-Fi network or a cellular network. Network 110 may comprise, for example, the Internet.

The elements described above of operating environment 100 (e.g., access device 105 and user device 115) may be practiced in hardware and/or in software (including firmware, resident software, micro-code, etc.) or in any other circuits or systems. The elements of operating environment 100 may be practiced in electrical circuits comprising discrete electronic elements, packaged or integrated electronic chips containing logic gates, a circuit utilizing a microprocessor, or on a single chip containing electronic elements or microprocessors. Furthermore, the elements of operating environment 100 may also be practiced using other technologies capable of performing logical operations such as, for example, AND, OR, and NOT, including but not limited to, mechanical, optical, fluidic, and quantum technologies. As described in greater detail below with respect to FIG. 3, the elements of operating environment 100 may be practiced in a computing device 300.

Figure 2:
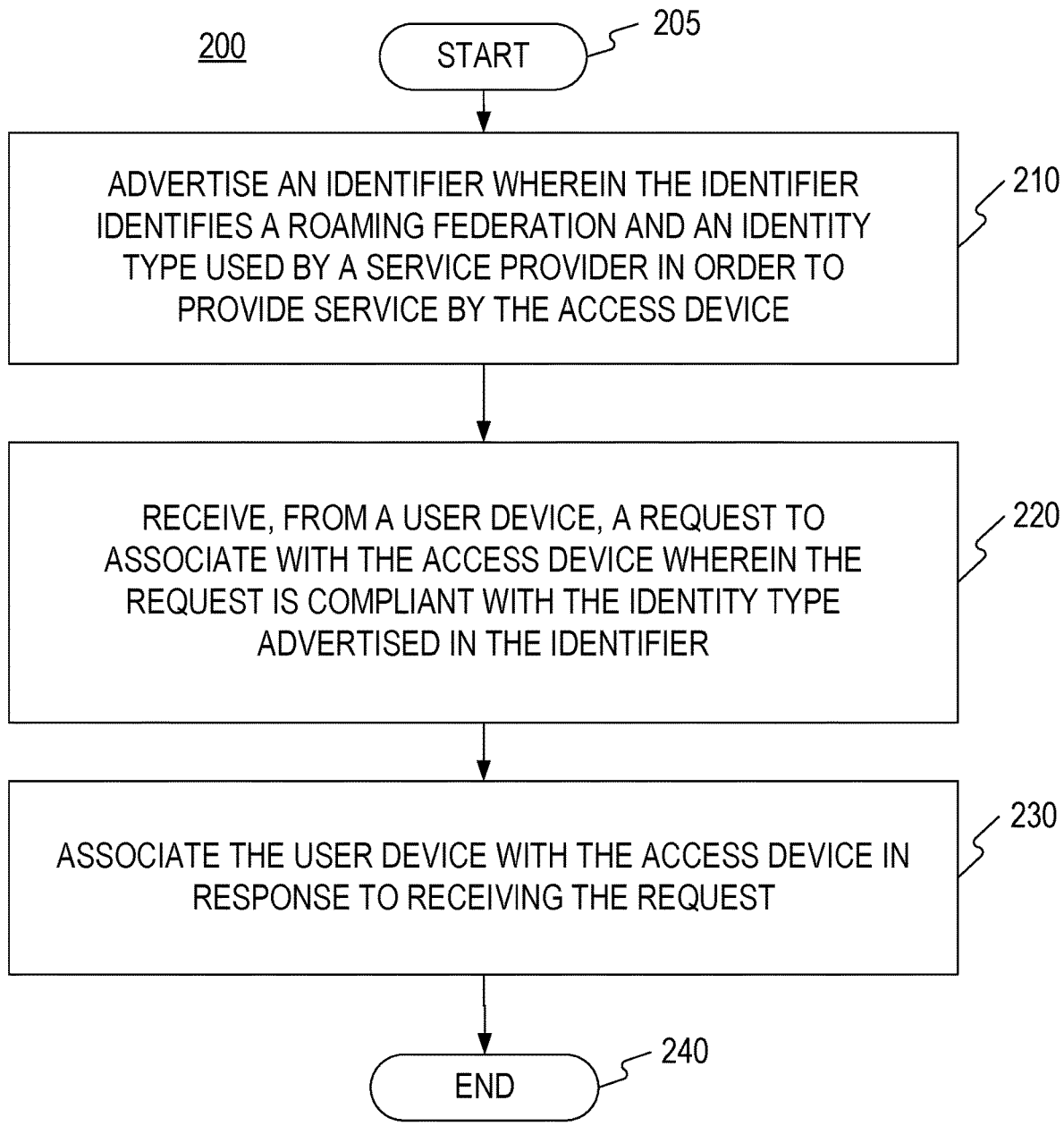
FIG. 2 is a flow chart of a method for providing Roaming Consortium Identifier (RCOI)-based handling of identity requirements.

FIG. 2 is a flow chart setting forth the general stages involved in a method 200 consistent with an embodiment of the disclosure for providing RCOI-based handling of identity requirements. Method 200 may be implemented using access device 105 as described in more detail above with respect to FIG. 1. Ways to implement the stages of method 200 will be described in greater detail below.

Method 200 may begin at starting block 205 and proceed to stage 210 where access device 105 may advertise an identifier. The identifier may identify an open roaming federation and an identity type used by a service provider in order to provide service by access device 105. For example, the identifier may comprise a Roaming Consortium Identifier (RCOI). Embodiments of the disclosure may also use a plurality of RCOIs within the same open roaming federation. For example, instead of advertising a single RCOI to represent the open roaming federation, embodiments of the disclosure may define a single open roaming federation that comprises, for example, the following four RCOIs. Each of the four RCOIs in this example, instead of being a separate open roaming federation, may be a string that not only identify the open roaming federation in general, but may also identify an identity type in use by the local access provider operating access device 105. The four example RCOIs may comprise, but are not limited to:

RCOI #1: public/weak
RCOI #2: public/strong
RCOI #3: anonymous/weak
RCOI #4: anonymous/strong Other examples may use the "EAP-UNAUTH-TLS" option in the Extensible Authentication Protocol (EAP) authorization protocol that may only use server side certificates, in which case there may be a ****/None additionally added to the above list to then define a total of eight RCOIs in this example. Furthermore, the RCOI may express more than the above four examples and may also be associated with, for example, Quality of Service (QoS), access condition values, or other parameters that may define not only identity requirements, but also other access conditions for the network.

A conventional RCOI may be a single value representing a group of Identity Providers (IdP). Embodiments of the disclosure may expand the RCOI count, and also use the RCOI in a way to express a quality rather than just an identity (i.e., the authentication strength allowed on the service provider's local network, instead of a simple IdP identifier). The quality expressed by embodiments of the disclosure may be about credential strength and requirements to disclose the user's (e.g., user 120) actual real identity, but any other type of quality expression may be used along the same principles, thus resulting in a process to express qualities associated to the network through the identity exchange.

In addition, embodiments of the disclosure may be used to solve incompatibilities between identity types. This way, an additional RCOI may be advertised to signify a whitelist or a blacklist. Thus, a first service provider controlling a shopping mall may accept public/strong, but may blacklist an untrusted second service provider IdP, although it claims to be strong in type (an additional RCOI may then be used to express this blacklist). The same process may be used to express a whitelist instead.

The usage of such differentiated RCOIs may be as follows for example. When a service provider (i.e., an access provider) joins the open roaming federation, it may declare its identity policies requirements. The appropriate RCOI (or RCOIs) may then be configured in the service provider's network to not only identify the open roaming federation, but also the identity type that the client is required to use. When an identity provider joins the open roaming federation, it may declare its identity policies. The appropriate RCOIs may then be configured in the profile of the devices (e.g., user device 115) of the identity provider users (e.g., user 120).

If the identity provider or their user 120 does not consent to their actual real identity being made available to the service provider, then only the anonymous/ RCOI of the above example may be configured in the profile of user device 115. If the identity provider or their user 120 does consents to their actual real identity been made available to the service provider, then both the public/ and anonymous/ RCOIs of the above example may be configured in the profile of user device 115. If the identity provider uses a "weak" form of proof in their identity management, then the /weak RCOIs of the above example may be configured in the profile of user device 115. If the identity provider uses a "strong" form of proof in their identity management, then both the /weak and /strong RCOIs of the above example may be configured in the profile of user device 115.

The terms "weak" and "strong" may be defined in multiple ways. In one embodiment, the identity provider may provide such definition as user 120's legal identity is required and verified to be considered a strong identity and voluntary registration without strict validation may be considered a weak identity. In another embodiment, identity provider identity strength may be vetted by a third party (e.g., the open roaming federation or other entities such as the Secure Identity Alliance).

Embodiments of the disclosure may include the explicit association of the identity strength to the profile configured on client device 115. When multiple profiles are configured, each profile may be associated with a label expressing the profile identity strength level, based on the identity provider type. Embodiments of the disclosure may also include that each service provider network, using a specific sub-group (or set of sub-groups) of the open roaming federation RCOI identifier, may be able to express the identity strength requirements mandated to automatically access the local guest network.

Using the processes described in the above example, a profile from the identity provider with anonymous and weak policies may be configured with the following RCOI: anonymous/weak. Similarly, a profile from the identity provider with public with weak and strong policies may be configured with the following RCOI: public/weak, public/strong, anonymous/weak, and anonymous/strong.

From stage 210, where access device 105 advertises the identifier where the identifier identifies the roaming federation and the identity type used by the service provider in order to provide service by access device 105, method 200 may advance to stage 220 where access device 105 may receive, from user device 115, a request to associate with access device 105 where the request is compliant with the identity type advertised in the identifier. For example, access device 105 may advertise the RCOI or RCOIs that reflects its service provider's identity requirements and user device 115 may be configured with its identity provider's policies. After receiving the RCOI or RCOIs from access device 105, user device 115 may search the profile previously provisioned on user device 115 and may only associate and attempt to authenticate to access device 105 if it uses policies that meet (i.e., are compliant with) the identity policies user device 115 was previously provisioned with.

Once access device 105 receives, from user device 115, the request to associate with access device 105 when the request is compliant with the identity type advertised in the identifier in stage 220, method 200 may continue to stage 230 where access device 105 may associate user device 115 with access device 105 in response to receiving the request. For example, the service provider may announce a public/strong identity type policy in the advertised identifier. A client (e.g., user device 115) accepting this identity type policy as being compliant with its provisioning may associate with access device 105 automatically, and may only use device identities labelled as strong (e.g. IMEI-based), and may display its actual real identity in the request. In the client (e.g., user device 115), multiple credentials may be configured or installed (OS, multiple emails, corporate identities, service provider identities). With embodiments of the disclosure, the client (e.g., user device 115) may know which subset of credentials may be acceptable to connect to access device 105, thus automatically discarding credentials that may not match the service provider's requirements. The client (e.g., user device 115) may also know that any set of credentials matching the type(s) advertised by the service provider through access device 105 may be sufficient to gain access, thus removing the need for manual selection. Furthermore, user 120, the service provider, or an enterprise providing user device 115, may sort the profiles present on user device 115 by preference, resulting in the possibility to prefer one public/strong profile to another (when more than one are configured), thus increasing the dimension space of the possibility matrix.

By contrast, the service provider may announce an anonymous/weak identity type in the advertised identifier. A client (e.g., user device 115) may accept this identity type as being compliant with its provisioning and may associate automatically with access device 105 using any identity (e.g., social media app ID), and may not expose its actual real identity in the part of the request visible to the service provider. The client (e.g., user device 115) may automatically use the credentials that maximize user privacy while respecting the local service provider constraints. By associating identity strength labels to the user profile provisioned on user device 115, embodiments of the disclosure may remove the burden for user 120 to manually pick a set of credentials, or have to evaluate which set of credentials may provide the best privacy protection.

Similarly, the service provider may announce an anonymous/weak and anonymous/strong identity type in the advertised identifier. A client (e.g., user device 115) accepting these identity types as being compliant with its provisioning may associate automatically with access device 105. In one embodiment, the client (e.g., user device 115) may use any identity (e.g., social media app ID). In another embodiment, the client (e.g., user device 115) may always prefer one of the identities (e.g., always strong when available, or always weak when available). In both cases, the client (e.g., user device 115) may not expose its actual real identity in the part of the request visible to the service provider. Local regulations, service providers, or user initial device configurations may provide additional flexibility or constraints in the credential choice logic (always choose strongest, or always choose weakest, etc.).

By contrast, the service provider may announce public/strong identity type in the advertised identifier, and a client (e.g., user device 115) accepts anonymous/weak and anonymous/strong. Such a client may not accept the public/strong identity type where the client identity must be exposed. This client may not associate automatically. There may be an embodiment where user 120 may be asked to override the process, thus providing an opt-in informed consent to share its actual real identity. This may result in a manual user interaction only when it is needed for association, thus suppressing the automation when a "superior requirement" mandates that user 120 make a conscious decision that the automation should not make. After access device 105 associates user device 115 with access device 105 in response to receiving the request in stage 230, method 200 may then end at stage 240.

Figure 3:
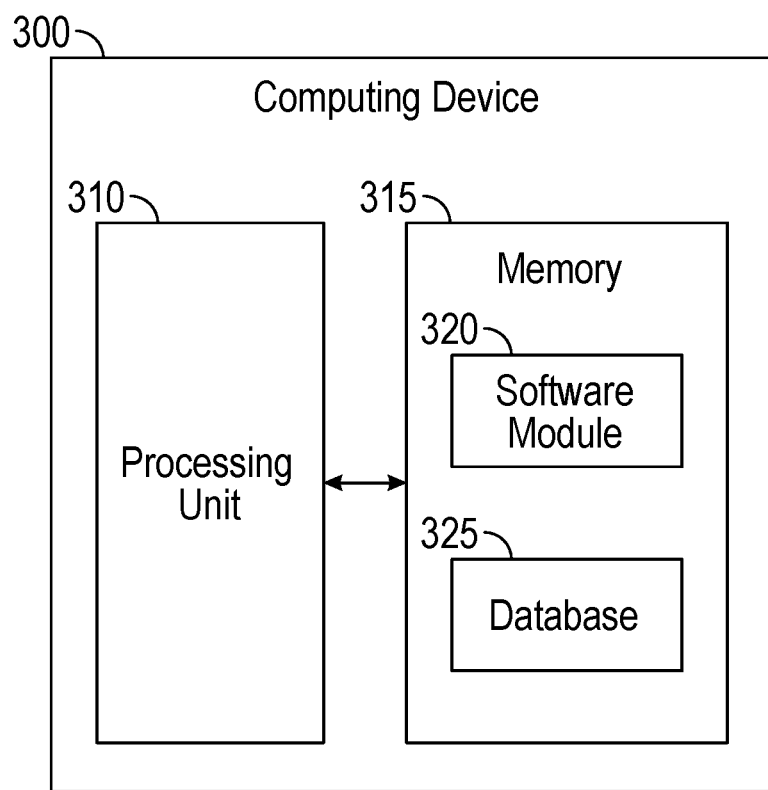
FIG. 3 is a block diagram of a computing device.

FIG. 3 shows computing device 300. As shown in FIG. 3, computing device 300 may include a processing unit 310 and a memory unit 315. Memory unit 315 may include a software module 320 and a database 325. While executing on processing unit 310, software module 320 may perform, for example, processes for providing RCOI-based handling of identity requirements as described above with respect to FIG. 2. Computing device 300, for example, may provide an operating environment for access device 105 or user device 115. Access device 105 and user device 115 may operate in other environments and are not limited to computing device 300.

Computing device 300 may be implemented using a Wireless Fidelity (Wi-Fi) access point, a cellular base station, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay devices, or other similar microcomputer-based device. Computing device 300 may comprise any computer operating environment, such as hand-held devices, multiprocessor systems, microprocessor-based or programmable sender electronic devices, minicomputers, mainframe computers, and the like. Computing device 300 may also be practiced in distributed computing environments where tasks are performed by remote processing devices. The aforementioned systems and devices are examples and computing device 300 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 300 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method, comprising:
    advertising, by an access device, an identifier, wherein the identifier identifies a single roaming federation and an identity type used by a service provider in order to provide service by the access device, wherein the single roaming federation comprises at least two Roaming Consortium Identifiers (RCOIs), wherein each of the at least two RCOIs is a string that identifies the single roaming federation and the identity type in use by the access device, and wherein a first RCOI of the at least two RCOIs expresses a first quality that is different from a second quality expressed by a second RCOI of the at least two RCOIs;
    receiving, from a user device, a request to associate with the access device, wherein the request is compliant with the identity type advertised in the identifier; and
    associating the user device with the access device in response to receiving the request.

2. The method of claim 1, wherein advertising the identifier comprises advertising the identifier comprising the at least two RCOIs.

3. The method of claim 1, wherein advertising by the access device comprises advertising by the access device wherein the access device comprises one of the following: an eNodeB and an gNodeB.

4. The method of claim 1, wherein advertising by the access device comprises advertising by the access device wherein the access device comprises a Wi-Fi Access Point (AP).

5. The method of claim 1, wherein advertising the identifier comprises advertising the identifier wherein the identity type comprises a public identity type in which identity data required in the request has to actually identify the user.

6. The method of claim 1, wherein advertising the identifier comprises advertising the identifier wherein the identity type comprises an anonymous identity type in which identity data required in the request does not have to actually identify the user.

7. The method of claim 1, wherein advertising the identifier comprises advertising the identifier wherein the identity type comprises a strong identity type in which identity data required in the request must be strong identity data.

8. The method of claim 1, wherein advertising the identifier comprises advertising the identifier wherein the identity type comprises a weak identity type in which identity data required in the request can be weak identity data.

9. The method of claim 1, further comprising:
    receiving, by the user device, the identifier from the access device;
    determining, by the user device, that the user device is provisioned with the identifier; and
    sending, by the user device to the access device, the request to associate with the access device in response to determining that the user device is provisioned with the identifier.

10. The method of claim 9, further comprising provisioning the user device with the identifier.

11. The method of claim 1, further comprising:
    receiving, by the user device, the identifier from the access device;
    determining, by the user device, that the user device is not provisioned with the identifier;
    receiving, by the user device, instructions to associate with the access device; and
    sending, by the user device to the access device, the request to associate with the access device in response to receiving the instructions to associate with the access device.

12. The method of claim 11, further comprising provisioning the user device with the identifier.

13. A method comprising:
    advertising, by an access device, a plurality of identifiers wherein each of the plurality of identifiers identifies a single roaming federation and an identity type used by a service provider in order to provide service by the access device, wherein the single roaming federation comprises at least two Roaming Consortium Identifiers (RCOIs), wherein each of the at least two RCOIs is a string that identifies the single roaming federation and the identity type in use by the access device, and wherein a first RCOI of the at least two RCOIs expresses a first quality that is different from a second quality expressed by a second RCOI of the at least two RCOIs;
    receiving, from a user device, a request to associate with the access device wherein the request is compliant with the identity type advertised in one of the plurality of identifiers; and
    associating the user device with the access device in response to receiving the request.

14. The method of claim 13, further comprising:
    receiving, by the user device, the plurality of identifiers from the access device;
    determining, by the user device, that the user device is provisioned with at least two of the plurality of identifiers;
    selecting a first one of the at least two of the plurality of identifiers that provides the greatest privacy protection; and
    sending, by the user device to the access device, the request to associate with the access device wherein the request is compliant with the first one of the at least two of the plurality of identifiers.

15. The method of claim 14, further comprising provisioning the user device with the plurality of identifiers.

16. A system comprising:
    a memory storage; and
    a processing unit coupled to the memory storage, wherein the processing unit is operative to:

provision the system with an identifier wherein the identifier identifies a single roaming federation and an identity type used in order to receive service from an access device, wherein the single roaming federation comprises at least two Roaming Consortium Identifiers (RCOIs), wherein each of the at least two RCOIs is a string that identifies the single roaming federation and the identity type in use by the access device, and wherein a first RCOI of the at least two RCOIs expresses a first quality which is different from a second quality expressed by a second RCOI of the at least two RCOIs;

receive the identifier from the access device;

determine that the system is provisioned with the identifier; and send, to the access device, a request to associate with the access device in response to determining that the system is provisioned with the identifier wherein the request is compliant with the identifier.

17. The system of claim 16, wherein the identity type comprises a public identity type in which identity data required in the request has to actually identify the user.

18. The system of claim 16, wherein the identity type comprises an anonymous identity type in which identity data required in the request does not have to actually identify the user.

19. The system of claim 16, wherein the identity type comprises a strong identity type in which identity data required in the request must be strong identity data.

20. The system of claim 16, wherein the identity type comprises a weak identity type in which identity data required in the request can be weak identity data.

* * * * *